(12) United States Patent
Burgoyne, Jr.

(10) Patent No.: US 6,716,955 B2
(45) Date of Patent: Apr. 6, 2004

(54) POLY(ARYLENE ETHER) POLYMER WITH LOW TEMPERATURE CROSSLINKING GRAFTS AND ADHESIVE COMPRISING THE SAME

(75) Inventor: William Franklin Burgoyne, Jr., Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/046,615

(22) Filed: Jan. 14, 2002

(65) Prior Publication Data

US 2003/0171527 A1 Sep. 11, 2003

(51) Int. Cl.$^7$ ............................................... C08G 65/34
(52) U.S. Cl. ..................... 528/86; 528/204; 528/205; 528/219; 528/425; 525/390; 427/487
(58) Field of Search .................... 528/86, 204, 205, 528/219, 425; 525/390; 427/487

(56) References Cited

U.S. PATENT DOCUMENTS

| | | | |
|---|---|---|---|
| 3,422,062 A | 1/1969 | Segal et al. ................... 260/47 |
| 4,634,742 A | 1/1987 | Percec ........................ 525/390 |
| 5,114,780 A | 5/1992 | Mercer ........................ 428/195 |
| 5,179,188 A | 1/1993 | Mercer et al. ............... 528/219 |
| 6,060,170 A | 5/2000 | Burgoyne, Jr. .............. 428/457 |

FOREIGN PATENT DOCUMENTS

| | | | | |
|---|---|---|---|---|
| EP | 0309025 | | 9/1988 | ........... C08G/65/44 |
| EP | 0755957 | * | 1/1997 | |
| EP | 0758664 | * | 2/1997 | |
| EP | 0939096 | | 9/1999 | ........... C08G/65/40 |

* cited by examiner

Primary Examiner—Duc Truong
(74) Attorney, Agent, or Firm—Keith D. Gourley

(57) ABSTRACT

A poly(arylene ether) polymer includes polymer repeat units of the following structure:

—(O—Ar$_1$—O—Ar$_2$—)$_m$—(O—Ar$_3$—O—Ar$_4$—)$_n$— where Ar$_1$, Ar$_2$, Ar$_3$, and Ar$_4$ are identical or different aryl radicals, m is 0 to 1, n is 1-m, and at least one of the aryl radicals is grafted to at least one unsaturated group that is non-aromatic and is adapted to crosslink at a curing temperature below 20° C. without producing volatiles during curing and without providing functional groups after curing. Cured films containing the polymer can have a Tg from 160° C. to 180° C., a dielectric constant below 2.7 with frequency independence, and a maximum moisture absorption of less than 0.17 wt %. Accordingly, the polymer is especially useful in interlayer dielectrics and in die-attach adhesives.

21 Claims, 5 Drawing Sheets

POLY(ARYLENE ETHER) POLYMER WITH LOW TEMPERATURE CROSSLINKING GRAFTS AND ADHESIVE COMPRISING THE SAME

BACKGROUND OF THE INVENTION

This invention relates to poly(arylene ether) polymers, and more particularly to grafting olefinic functional groups to the backbone of poly(arylene ether) polymers to provide cross-linkable polymers having particular utility as coatings and adhesives with high glass transition temperatures and low moisture uptake.

The electronics industry has recently sought low dielectric materials for use in fabricating very fine dimensioned integrated circuits. However, the need for materials compatibility and dimensional stability over a wide range of conditions not only during ultimate end use, but also during further processing conditions leading to the finished integrated circuits, has presented a significant problem. The problem has been to make a polymeric thermoset system. This problem has been a very difficult one to solve, particularly for high Tg polymers where the desired temperature for reaction (i.e., cure) is below 450° C. and more preferably below 200° C.

Therefore, there is a need in the electronic fabrication industry for the replacement of silica-based, interlayer dielectric materials with materials of lower dielectric values. Silica and its modified versions have dielectric values on the order of 3.0 to 5.0 and usually 4.0 to 4.5. Polymeric materials used as replacements for silica as interlayer dielectric materials can have dielectric constant values in the range of 1.9 to 3.5, which values are highly dependent on the structure of the polymeric materials. To successfully replace silica as an interlayer dielectric material, the properties of polymeric materials must conform to the rigid manufacturing requirements for integrated circuits or microchips in the electronic fabrication industry. Crosslinking has been recognized as one way to address the requirements of electronic materials polymers.

Past attempts utilized various different approaches for crosslinking polymers. A detailed summary of these attempts is provided in the inventor's U.S. Pat. No. 6,060,170, assigned to Air Products & Chemicals, Inc. The document itself teaches use of poly(arylene ether) polymer compositions having aromatic groups grafted on the poly (arylene ether) backbone, which grafts allow for crosslinking of the polymers in a temperature range of 200 to 450° C. A further reduction in crosslinking temperature would, however, be desirable.

U.S. Pat. Nos. 5,179,188 and 5,114,780 to Mercer et al. also disclose poly(arylene ether)-based polymers. These patents teach that fluorinating the backbone of such polymers provides a dielectric material with superior properties. However, the use of fluorinated arylene groups in the backbone of the polymer introduces functional reactive groups, which in turn deteriorate insulating and moisture adsorption properties.

Integrated circuit and chip manufacturing require suitable coatings and adhesives, especially die-attach adhesives. These adhesives are required to have low dielectric constants. In addition, it is desired to provide these die-attach adhesives with unlimited storage stability at 25° C., storage stability at 40° C. sufficient to weather transportation in non-refrigerated vehicles, and cure temperatures of 170 to 190° C. within 1 to 2 hours. After cure, it is desired to have a Tg in the range of 160 to 180° C., a dielectric constant below 2.7 with frequency independence, and a maximum moisture absorption of less than 0.17 wt %.

All references cited herein are incorporated herein by reference in their entireties.

BRIEF SUMMARY OF THE INVENTION

Accordingly, the invention provides a poly(arylene ether) polymer including polymer repeat units of the following structure:

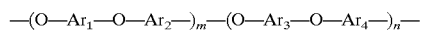

—(O—Ar$_1$—O—Ar$_2$—)$_m$—(O—Ar$_3$—O—Ar$_4$—)$_n$— where Ar$_1$, Ar$_2$, Ar$_3$, and Ar$_4$ are identical or different aryl radicals, m is 0 to 1, n is 1-m, and at least one of the aryl radicals is grafted to at least one unsaturated group that is non-aromatic and is adapted to crosslink at a curing temperature below 200° C. without producing volatiles during curing and without providing functional groups after curing.

Also provided is a composition comprising the polymer, and optionally, a diluent, which does not afford a functional group or interfere with the mechanical or electrical properties of the composition.

Still further provided is a method for providing a substrate with a film having a Tg from 160° C. to 180° C., a dielectric constant below 2.7 with frequency independence, and a maximum moisture absorption of less than 0.17 wt %, the method comprising applying the polymer of the invention to the substrate and heating the polymer to a curing temperature below 200° C.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
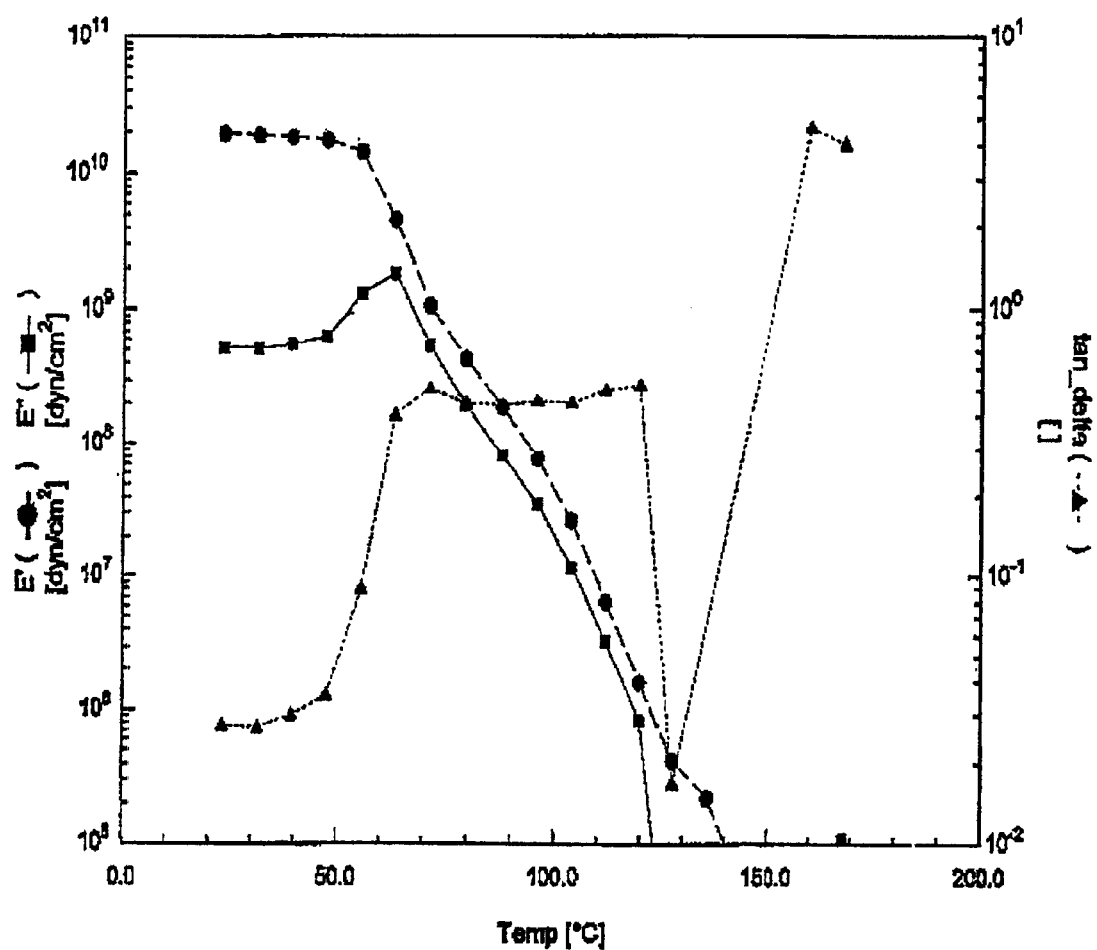
FIG. 1 is a plot of E', E" and tan(delta) versus temperature for the composition of Example 9 without curing.
Figure 2:
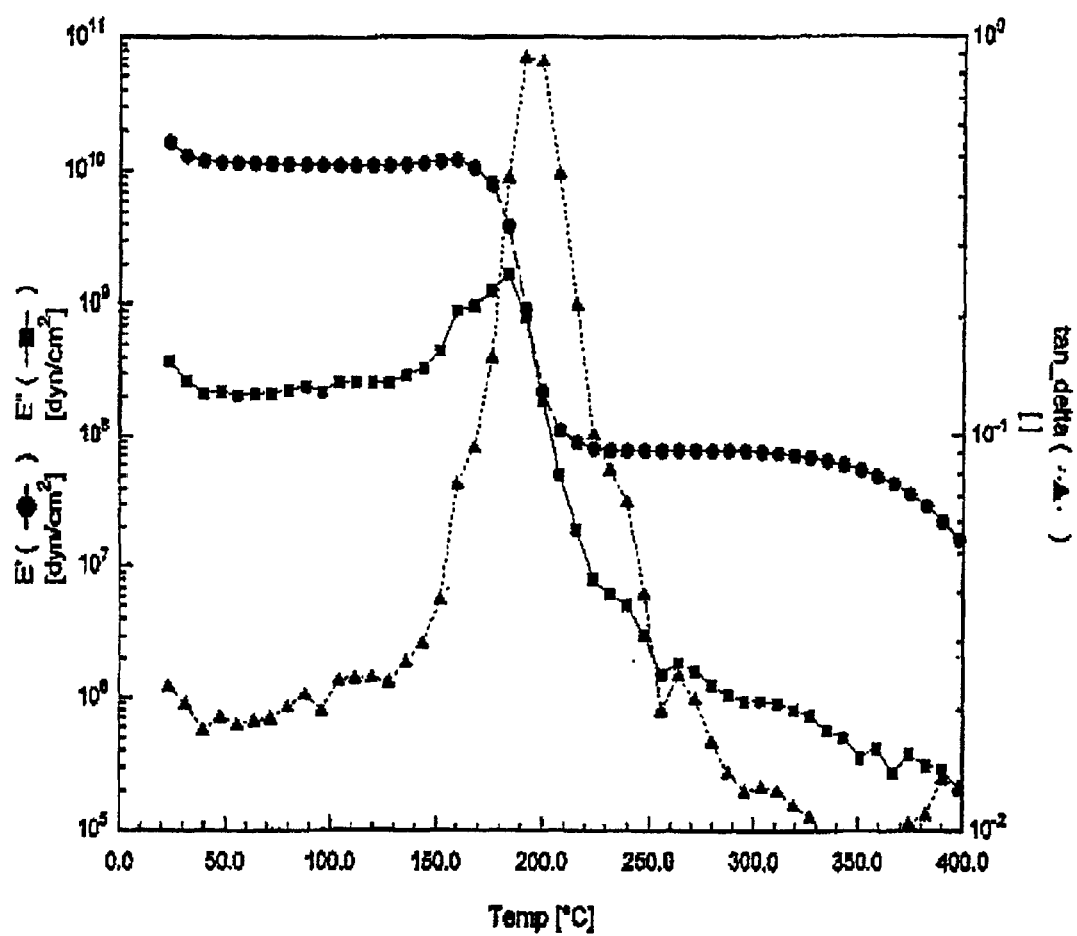
FIG. 2 is a plot of E', E" and tan(delta) versus temperature for the composition of Example 9 after curing.
Figure 3:
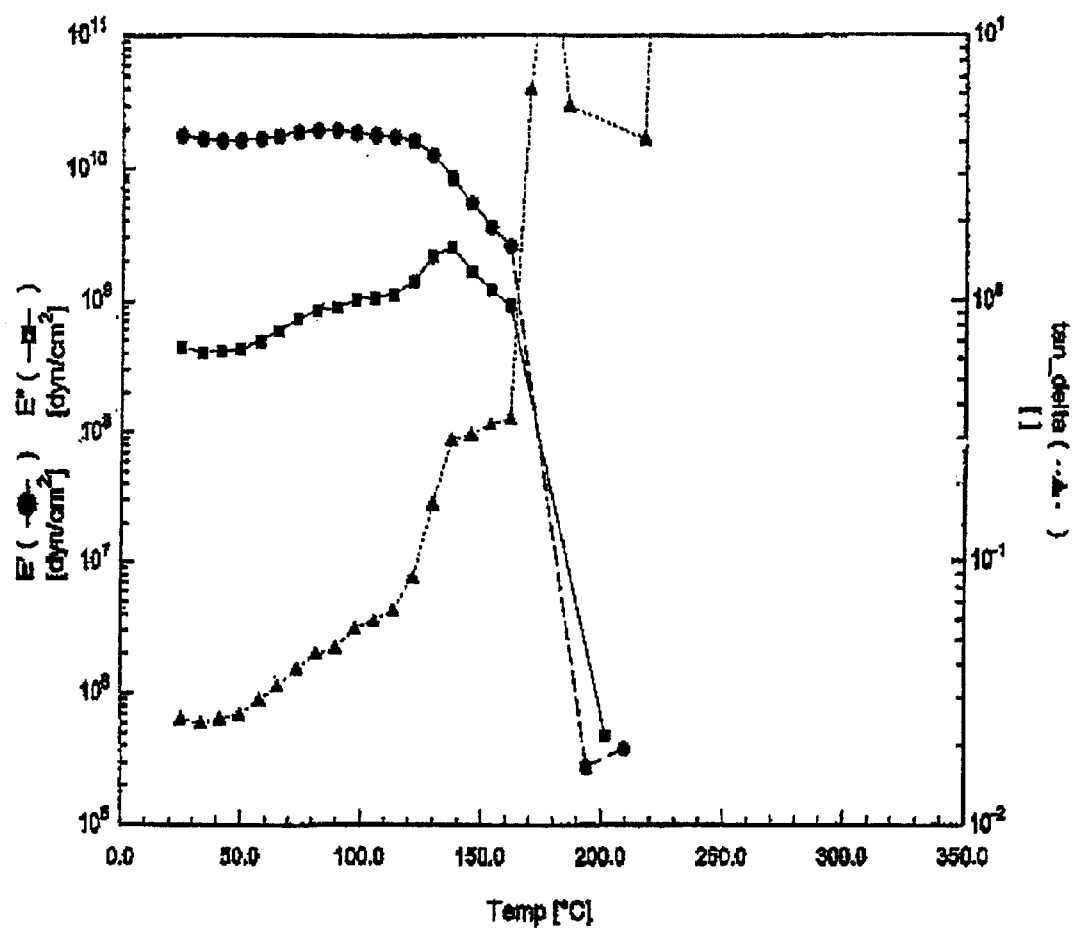
FIG. 3 is a plot of E', E" and tan(delta) versus temperature for the composition of Example 10 without curing.
Figure 4:
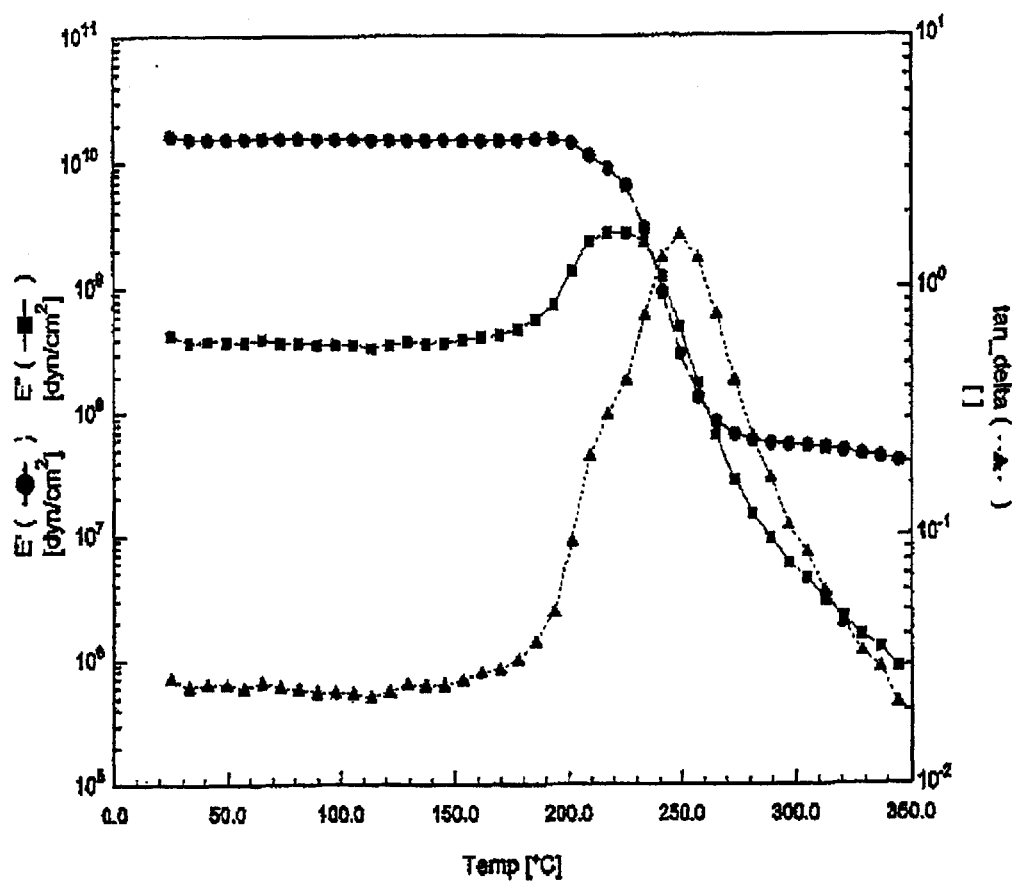
FIG. 4 is a plot of E', E" and tan(delta) versus temperature for the composition of Example 10 after curing.

The aforementioned drawbacks of the prior art are overcome by grafting onto poly(arylene ether) polymers unsaturated groups (i.e., grafts (G)), which can crosslink at a curing temperature of less than 200° C. The invention thus relates to specific poly(arylene ether) polymers and compositions containing them, their use as adhesives, sealants, dielectrics, passivation layers, coatings or in photo-imaging, a microelectronic device comprising the same, a method of crosslinking the polymers, and an adhesive comprising such poly(arylene ether) polymers, optionally in combination with a reactive diluent. Curing can be accomplished by heating wherein the polymer curing is initiated with UV radiation.

Polymers of the invention comprise polymer repeat units represented by the following structure:

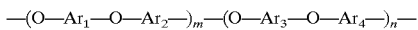

where $Ar_1$, $Ar_2$, $Ar_3$, and $Ar_4$ are identical or different aryl radicals, m is 0 to 1, n is 1-m, and at least one of the aryl radicals is grafted to at least one unsaturated group (G), which is not aromatic and is adapted to crosslink at a curing temperature less than 200° C. without producing volatiles during curing and without providing functional groups after curing. In certain embodiments, each of the aryl radicals of the polymer repeat units is grafted to two unsaturated groups G, as shown in the following structure:

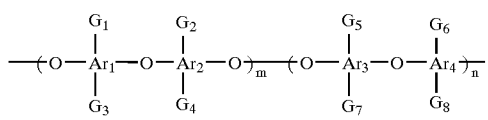

where $G_1$, $G_2$, $G_3$, $G_4$, $G_5$, $G_6$, $G_7$ and $G_8$ are identical or different unsaturated groups.

Polymers of the invention do not necessarily consist only of these polymer repeat units (i.e., G-containing polymer repeat units). In addition to embodiments wherein the polymer is built solely from the G-containing polymer repeat units, the invention also encompasses polymers comprising other polymer repeat units in addition to the G-containing polymer repeat units, such as, e.g., poly(arylene ether) polymer repeat units lacking any unsaturated grafts (i.e., G-free polymer repeat units). The sequence in which different polymer repeat units can be combined to form the polymer of the invention is not particularly limited. Thus, polymers of the invention can be, e.g., random, alternating, or block copolymers of the different polymer repeat units.

The average number of unsaturated groups G per polymer repeat unit is preferably 0.01 to 8.0, more preferably 0.1 to 4.0, even more preferably 0.25 to 1. This average is calculated as the total number of unsaturated groups G per polymer divided by the total number of polymer repeat units per polymer.

Preferably, the unsaturated groups G are olefins independently selected from the group consisting of an alkylene radical, an alkyldiene radical, an α-hydroxyalkylene radical and an α-hydroxyalkyldiene radical. In certain embodiments, the unsaturated groups G are derived from isoprene units. Most preferably, the unsaturated groups G are independently selected from the group consisting of:

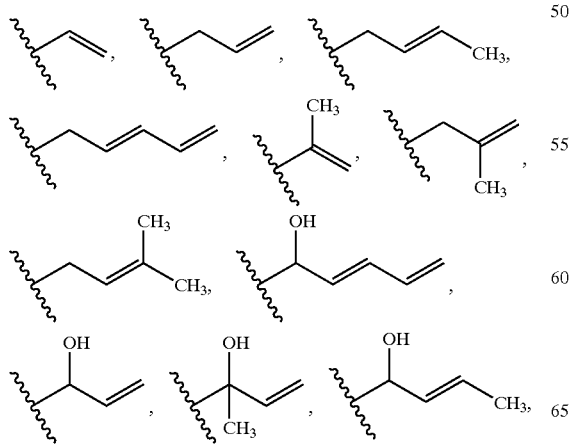

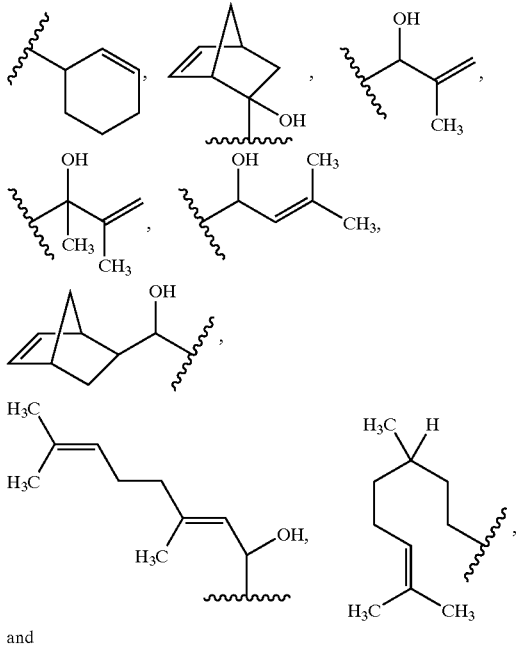

and

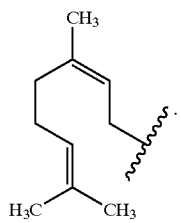

Preferably, the aryl radicals $Ar_1$, $Ar_2$, $Ar_3$, and $Ar_4$ are independently selected from the group consisting of:

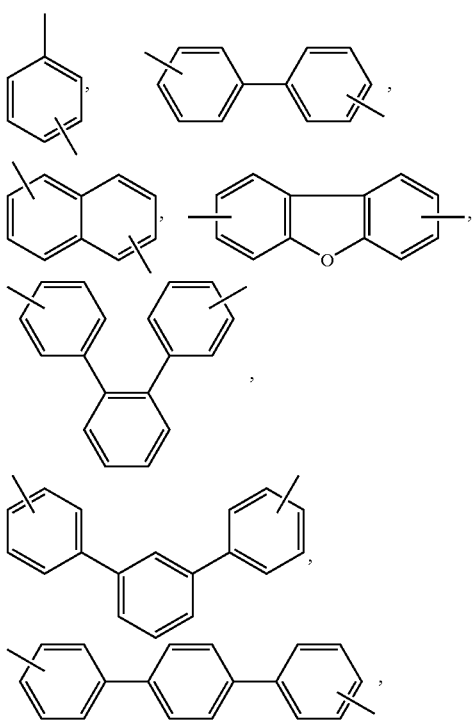

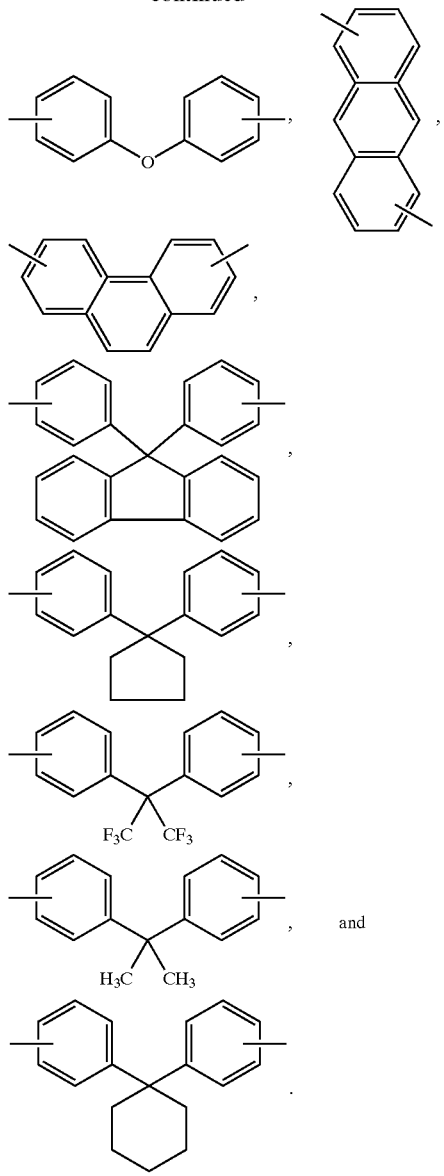
More preferably at least one of aryl radicals $Ar_1$, $Ar_2$, $Ar_3$ and $Ar_4$ is (and still more preferably, each of $Ar_1$ and $Ar_3$ is independently) 9,9-bis(4-hydroxyphenyl)-fluorene, 2,2-diphenylhexafluoropropane or 2,2-diphenylpropane.
An additional preferred aryl radical is
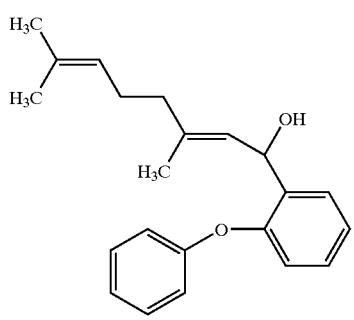
Preferred examples of aryl radicals having unsaturated group(s) grafted thereto include:
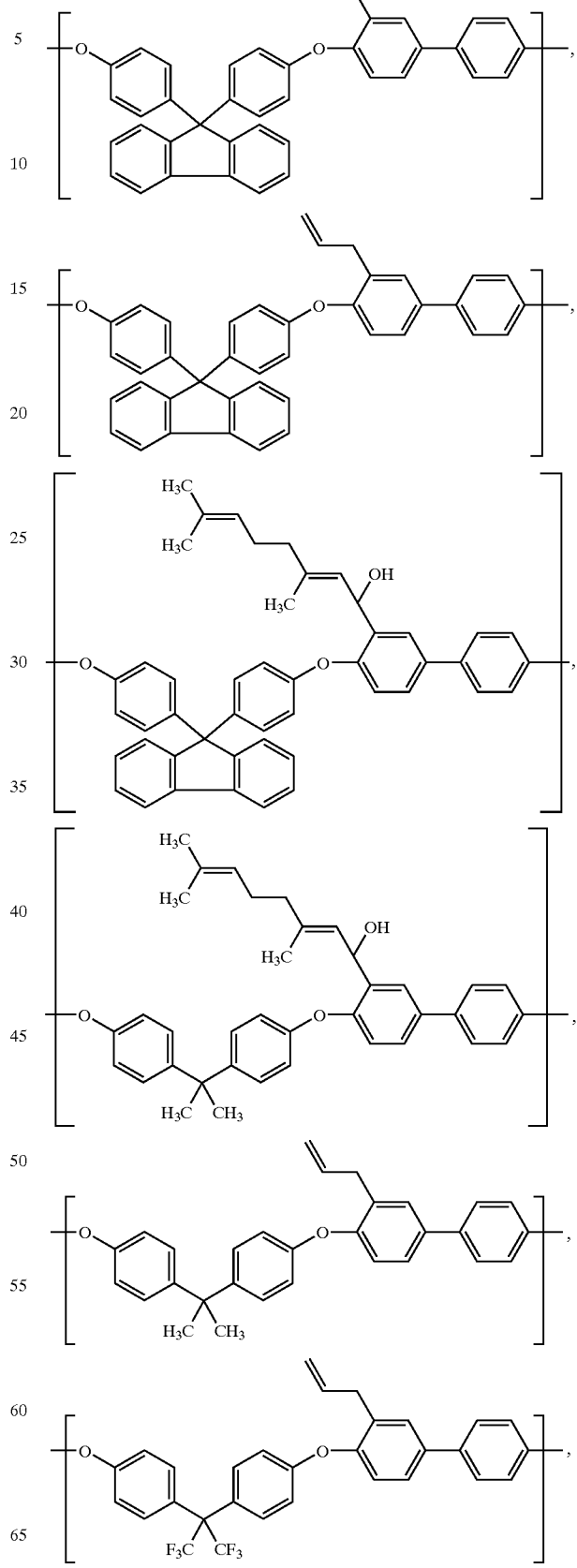

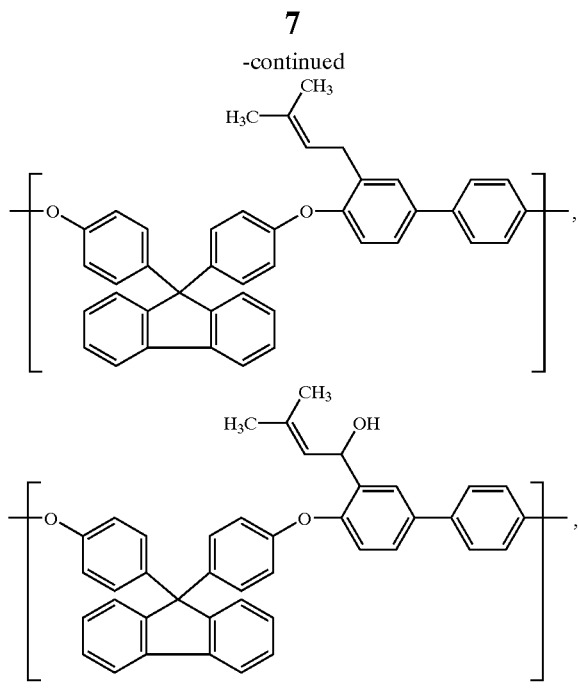
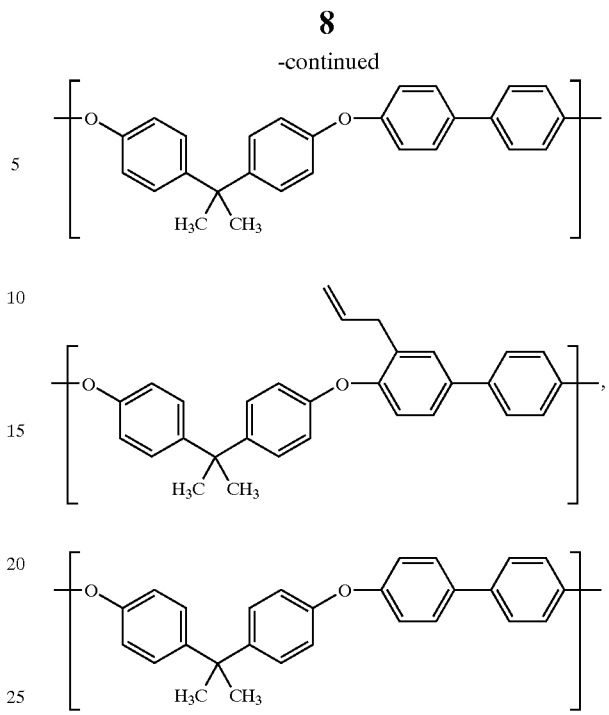
and the corresponding non-grafted polymer repeat units. Preferred polymer repeat units of the invention include:
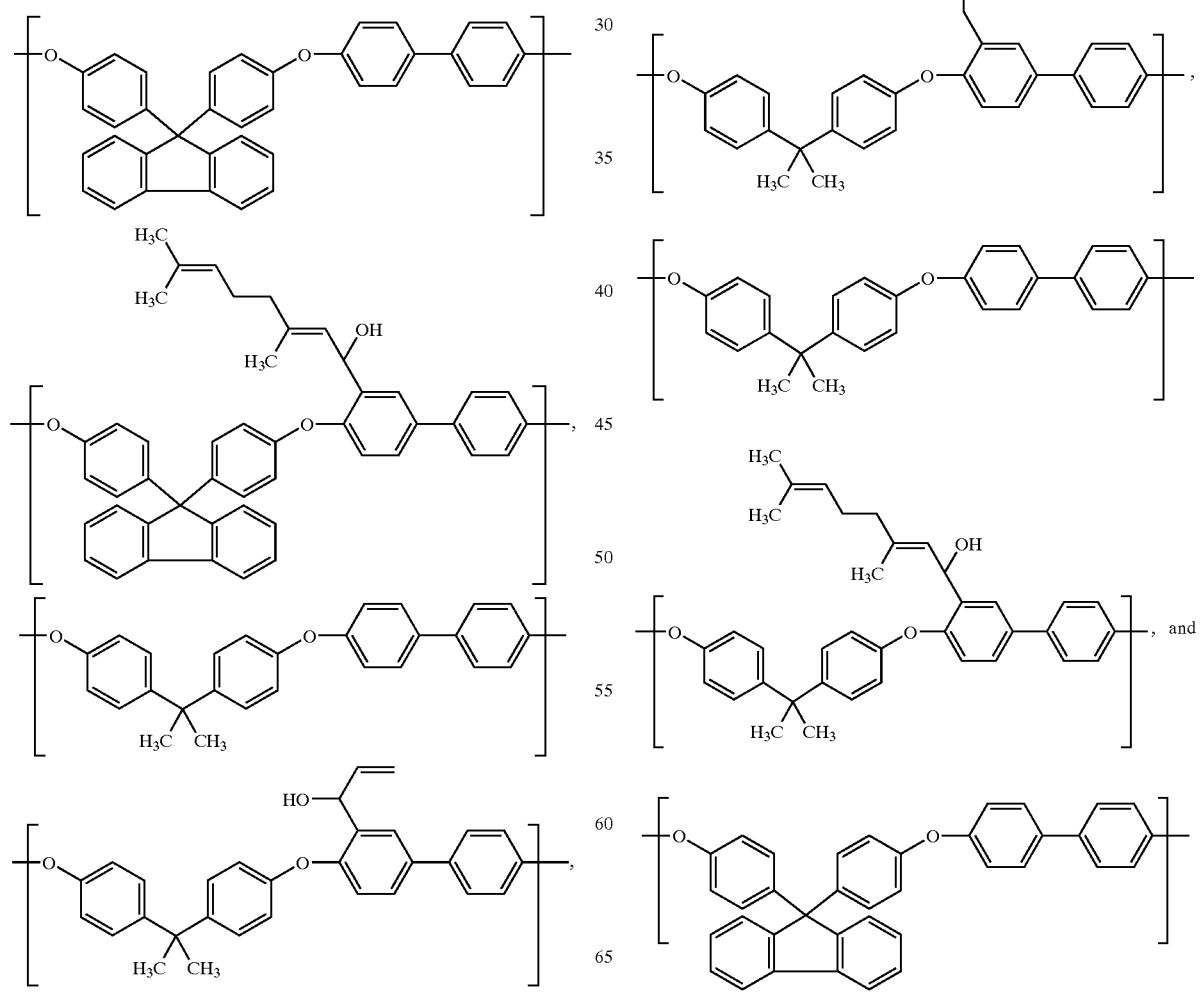

-continued

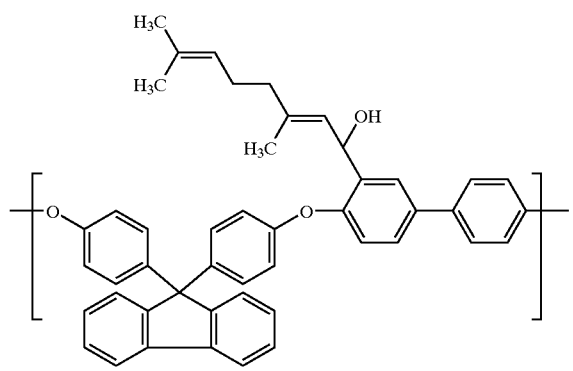

The invention encompasses the foregoing polymers in cured (crosslinked) condition and uncured condition. Polymers of the invention can be thermally cured by heating to a temperature of at least about 90° C., preferably 100° C. to less than 200° C., more preferably 170° C. to 190° C. Optionally, crosslinking is induced in the presence of a catalyst selected from the group consisting of a mineral acid, an organic acid, a free radical starter, an azo-initiator and mixtures thereof. In the case of unsaturated groups G having a pendent hydroxyl group (e.g., as is the case with a citral appendage), crosslinking typically occurs by: (a) cyclization via dehydration, or (b) formation of an ether linkage:

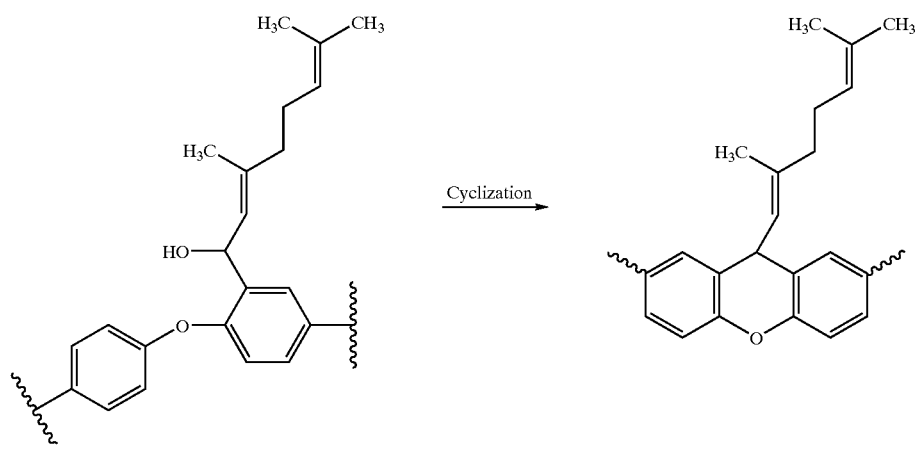

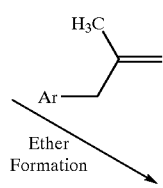

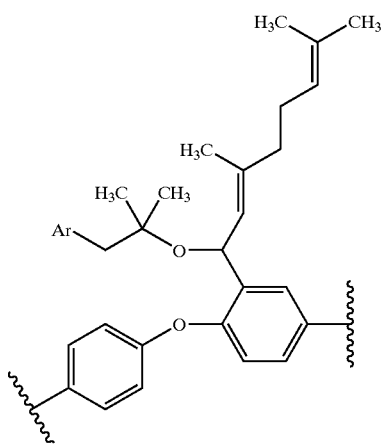

In the case of unsaturated groups G lacking a pendent hydroxyl group, crosslinking typically occurs akylation of the aromatic ring:

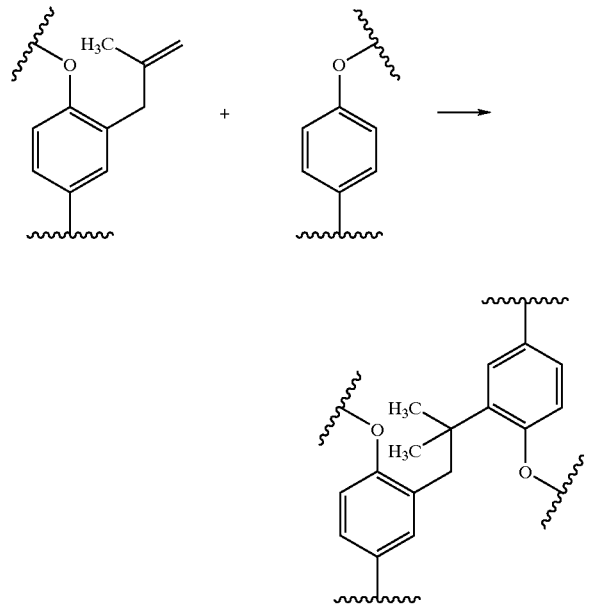

or olefin coupling:

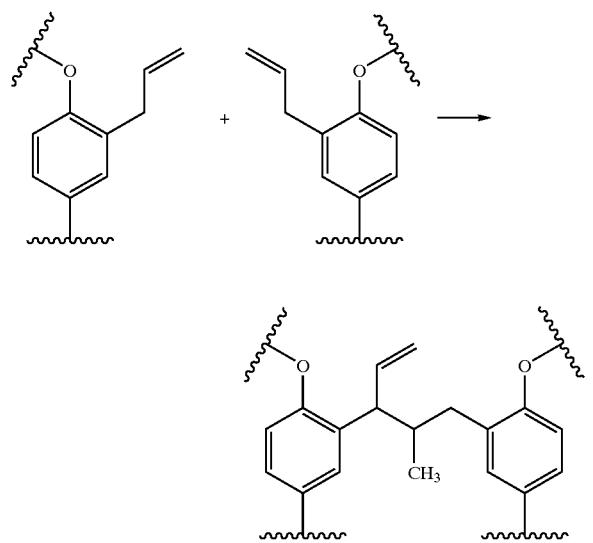

The invention also encompasses compositions (cured and uncured) comprising at least one polymer of the invention. The compositions, like the polymers themselves, are useful as adhesives, sealants, dielectrics, passivation layers, coatings or in photoimaging. In addition to the at least one polymer, the compositions can further contain additional ingredients, including but not limited to, a diluent, a reactive solvent, a plasticizer, or an inorganic filler.

Preferred diluents can be incorporated into the composition upon crosslinking, but do not afford a functional group or interfere with the mechanical or electrical properties of the composition. Hence, preferred diluents allow for an adhesive that can be applied as a paste and can reduce the cost of overall adhesive system. Non-limiting examples of suitable diluents include:

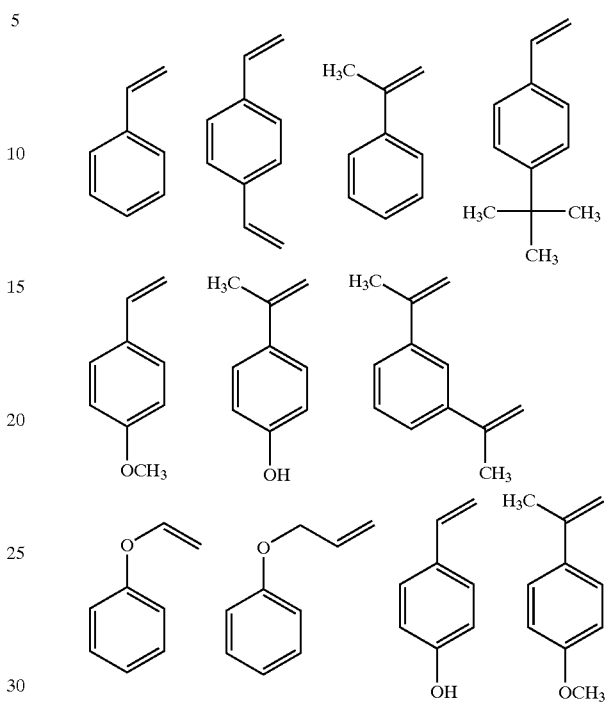

Polymers of the invention can be provided by modifying the poly(arylene ether) grafting process described in the inventor's earlier U.S. Pat. No. 6,060,170 to graft to the poly(arylene ether) backbone non-aromatic unsaturated groups G, rather than the specified aromatic groups of the '170 patent. Thus, polymers of the invention are produced by a process comprising direct lithiation of the aryl ether (preferably with tert-butyllithium) followed by addition of an electrophile. Generally, an acid is added at the end of the reaction to neutralize any residual lithium salts. The grafting process is preferably conducted in a solvent selected from the group consisting of tetrahydrofuran, glyme, ethyl ether, butyl ethyl ether, tert-butyl methyl ether, 2-methoxyethyl ether, di(ethylene glycol)diethyl ether and mixtures thereof.

The resulting polymers, when cured as discussed above, possess such desirable properties as a Tg from 160 to 180° C., a dielectric constant below 2.7 with frequency independence, and a maximum moisture absorption of less than 0.17 wt %. Consequently, the polymers and polymer-containing compositions of the invention are particularly suitable for use as die-attach adhesives. The invention therefore further encompasses such adhesives and methods for applying them to substrates.

In addition the invention relates to any microelectronic device comprising the polymer or polymer-containing composition as defined above. Preferably, the microelectronic device contains the polymer in cured form as a die-attach adhesive, a dielectric or a passivation layer.

The invention will be illustrated in more detail with reference to the following Examples, but it should be understood that the present invention is not deemed to be limited thereto.

EXAMPLE 1

Preparation of Poly(Arylene Ether), PAE-1A

A mixture of 114.14 g (0.5000 mol) of 4,4'-isopropylidenediphenol (bisphenol A), 250 g of mixed xylenes, and 500 g of benzophenone was charged to a 2000 mL, 3-necked, round-bottomed flask fitted with a Dean-Stark trap, condenser, nitrogen inlet, mechanical stirrer, and thermometer. The mixture was heated to 60° C. with stirring under a nitrogen atmosphere. After homogeneity had been reached, 80.000 g of a 50.00 wt % aqueous solution of sodium hydroxide (1.0000 mol of sodium hydroxide) were slowly added over 10 min. The reaction mixture was heated to about 140° C. and the water azeotrope was collected. After 4 hours and complete dehydration, the temperature of the reaction mixture was increased to 200° C. and the mixed xylenes were removed via distillation. The reaction mixture was cooled to 80° C. and 156.01 g (0.5000 mol) of 4,4'-dibromobiphenyl were added. The reaction mixture was then heated to 200° C. A 10 mL portion of a copper (I) chloride/quinoline solution (containing 0.10 g of copper (I) chloride, 1.00 mmol) was added and the reaction mixture was maintained at 200° C. for 17 hours. The reaction mixture was cooled to 100° C., and 250 g of mixed xylenes were added. The reaction mixture was then quenched in a rapidly stirred solution of 300 g of acetic acid in 2000 mL of methanol. The precipitate was isolated and placed in 2 L of boiling water for 6 hours. The precipitate was then placed in 2000 mL of methanol overnight. After isolating and drying the precipitate, it was then dissolved in 2000 mL of tetrahydrofuran. After filtering the solution, it was then precipitated in methanol at a 1:4 ratio of polymer solution to methanol. The precipitate was collected, washed with methanol, and then dried in a vacuum oven at 100° C. overnight. This procedure yielded 153.9 g of polymer, which possessed the following properties:

Molecular weight (by GPC): Mw=24,500; Mn=9,100; d=2.69; Tg (by DSC): 151° C.

The polymer repeat unit of the resulting polymer is represented by the following structure:

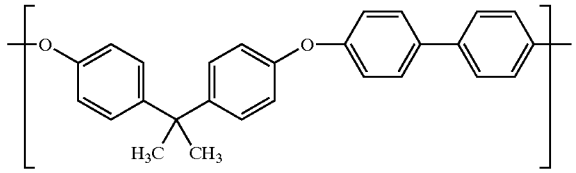

EXAMPLE 2

Preparation of Poly(Arylene Ether), PAE-1 B

A mixture of 114.14 g (0.5000 mol) of 4,4'-isopropylidenediphenol (bisphenol A), 250 g of mixed xylenes, and 500 g of benzophenone was charged to a 2000 mL, 3-necked, round-bottomed flask fitted with a Dean-Stark trap, condenser, nitrogen inlet, mechanical stirrer, and thermometer. The mixture was heated to 60° C. with stirring under a nitrogen atmosphere. After homogeneity had been reached, 80.000 g of a 50.00 wt % aqueous solution of sodium hydroxide (1.0000 mol of sodium hydroxide) were slowly added over 10 min. The reaction mixture was heated to about 140° C. and the water azeotrope was collected. After 4 hours and complete dehydration, the temperature of the reaction mixture was increased to 200° C. and the mixed xylenes were removed via distillation. The reaction mixture was cooled to 80° C. and 164.01 g (0.5000 mol) of 4-bromophenyl ether were added. The reaction mixture was then heated to 200° C. A 10 mL portion of a copper (I) chloride/quinoline solution (containing 0.10 g of copper (I) chloride, 1.00 mmol) was added and the reaction mixture was maintained at 200° C. for 17 hours. The reaction mixture was cooled to 100° C., and 250 g of mixed xylenes were added. The reaction mixture was then quenched in a rapidly stirred solution of 300 g of acetic acid in 2000 mL of methanol. The precipitate was isolated and placed in 2 L of boiling water for 6 hours. The precipitate was then placed in 2000 mL of methanol overnight. After isolating and drying the precipitate, it was then dissolved in 2000 mL of tetrahydrofuran. After filtering the solution, it was then precipitated in methanol at a 1:4 ratio of polymer solution to methanol. The precipitate was collected, washed with methanol, and then dried in a vacuum oven at 100° C. overnight. This procedure afforded 165.0 g of polymer which possessed the following properties: Molecular weight (by GPC): Mw=9,800; Mn=4,400; d=2.24; Tg (by DSC): 99° C.

The polymer repeat unit of the resulting polymer is represented by the following structure:

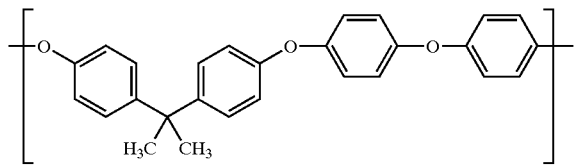

EXAMPLE 3

Preparation of Poly(Arylene Ether), PAE-2

A mixture of 35.0421 g (0.1000 mol) of 9,9-bis(4-hydroxyphenyl)fluorene, 75 g of toluene, and 100 g of benzophenone was charged to a 500 mL, 3-necked, round-bottomed flask fitted with a Dean-Stark trap, condenser, nitrogen inlet, mechanical stirrer, and thermometer. The mixture was heated to 60° C. with stirring under a nitrogen atmosphere. After homogeneity had been reached, 16.000 g of a 50.00 wt % aqueous solution of sodium hydroxide (0.2000 mol of sodium hydroxide) were slowly added over 10 min. The reaction mixture was heated to about 140° C. and the water azeotrope was collected. After 4 hours and complete dehydration, the temperature of the reaction mixture was increased to 200° C. and the toluene was removed via distillation. The reaction mixture was cooled to 80° C. and 31.202 g (0.1000 mol) of 4,4'-dibromobiphenyl were added. The reaction mixture was then heated to 200° C. A 10 mL portion of a copper (I) chloride/quinoline solution (containing 0.10 g of copper (I) chloride, 1.00 mmol) was added and the reaction mixture was maintained at 200° C. for 48 hours. The reaction mixture was cooled to 100° C., and 200 g of toluene were added. The reaction mixture was then quenched in a rapidly stirred solution of 25 g of acetic acid in 1000 g of methanol. The precipitate was isolated and placed in 2 L of boiling water for 8 hours. The precipitate was first dried in an oven (100° C.) then dissolved in 300 g of tetrahydrofuran. The polymer solution was filtered and then precipitated in 1 L of methanol. The precipitate was collected, washed with methanol, and then dried in a vacuum oven at 100° C. overnight. This procedure afforded 42 g of polymer which possessed the following properties: Molecular weight (by GPC): Mw=65,300; Mn=20,700; d=3.16; Tg (by DSC): 257° C.; Thermal stability (by TGA, isothermal weight loss at 400° C.):<0.1 wt % loss/hr.

The polymer repeat unit of the resulting polymer is represented by the following structure:

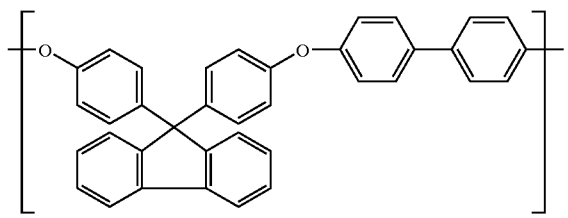

EXAMPLE 4

Grafting Allyl Bromide onto PAE-1A

The process of this example is represented by the following equation:

In a 500 mL, three-necked, round-bottomed flask fitted with a mechanical stirrer, nitrogen inlet, and addition funnel, 20.00 g (0.0528 mol of polymer repeat unit) of the poly (arylene ether), PAE-1A, prepared in Example 1 were dissolved in 350 mL of anhydrous tetrahydrofuran with stirring. The solution was cooled to −40° C. with the aid of a carbon dioxide/acetone bath. With vigorous stirring, 15 mL (0.0255 mol) of 1.7 M tert-butyllithium in pentane were added over a 5–15 minute period. The solution turned from a clear, light yellow colored solution to a deep red colored solution. The cooling bath was removed and the solution was allowed to warm to −10° C. A 2.41 g (0.0200 mol) portion of allyl bromide was added. The cooling bath was removed and the solution was gradually warmed to 20° C. over 30 minutes. After maintaining the reaction mixture at this temperature for 3 hours with stirring, 20 mL of acetic acid were added. The light green solution was filtered and then precipitated in 1600 mL of methanol. After drying the polymer precipitate in a vacuum oven set at 60° C., 19.69 g of PAE-1A polymer bearing allyl groups ortho to the ether links in the polymer were recovered. NMR analysis of the polymer revealed that 39.0% of the polymer repeat units contained the grafted allyl group.

EXAMPLE 5

Grafting 3-Chloro-2-Methylpropene onto PAE-1A

The process of this example is represented by the following equation:

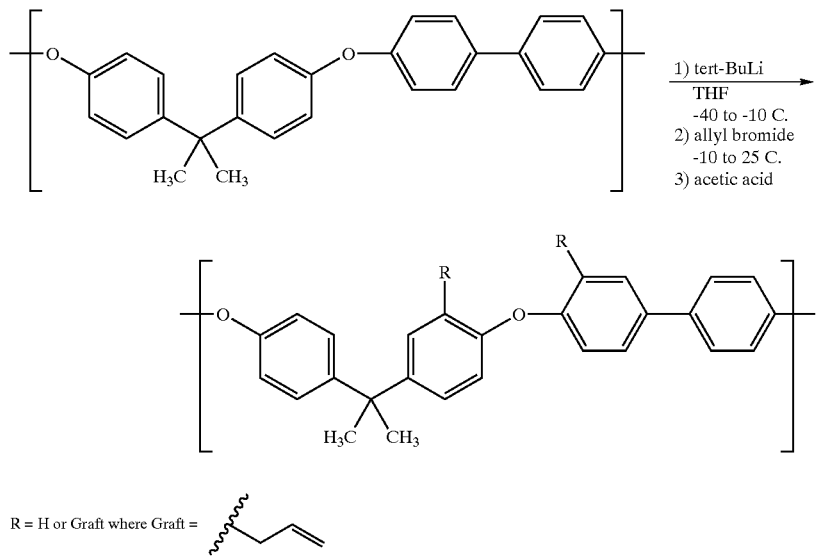

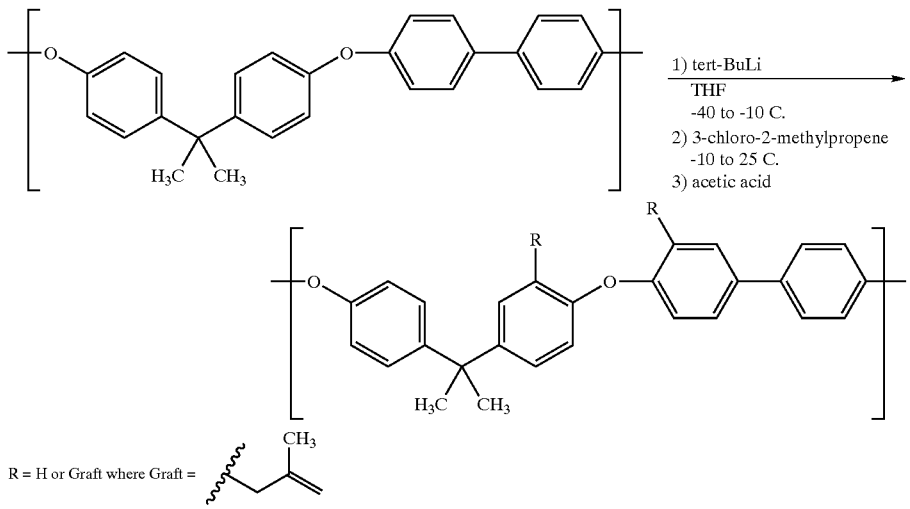

In a 500 mL, three-necked, round-bottomed flask fitted with a mechanical stirrer, nitrogen inlet, and addition funnel, 25.00 g (0.0661 mol of polymer repeat unit) of PAE-1 prepared in Example 1 were dissolved in 350 mL of anhydrous tetrahydrofuran with stirring. The solution was cooled to −40° C. with the aid of a carbon dioxide/acetone bath. With vigorous stirring, 15 mL (0.0255 mol) of 1.7 M tert-butyllithium in pentane were added over a 5–15 minute period. The solution turned from a clear, light yellow colored solution to a deep red colored solution. The cooling bath was removed and the solution was allowed to warm to −10° C. A 2.00 g (0.0221 mol) portion of 3-chloro-2-methylpropene was added. The cooling bath was removed and the solution was gradually warmed to 20° C. over 30 minutes. After maintaining the reaction mixture at this temperature for 3 hours with stirring, 20 mL of acetic acid were added. The light green solution was filtered and then precipitated in 1600 mL of methanol. After drying the polymer precipitate in a vacuum oven set at 60° C., 21.53 g of PAE-1A polymer bearing methallyl groups ortho to the ether links in the polymer were recovered. NMR analysis of the polymer revealed that 32.0% of the polymer repeat units contained the methallyl group.

EXAMPLE 6

Grafting Allyl Bromide onto PAE-1B

The process of this example is represented by the following equation:

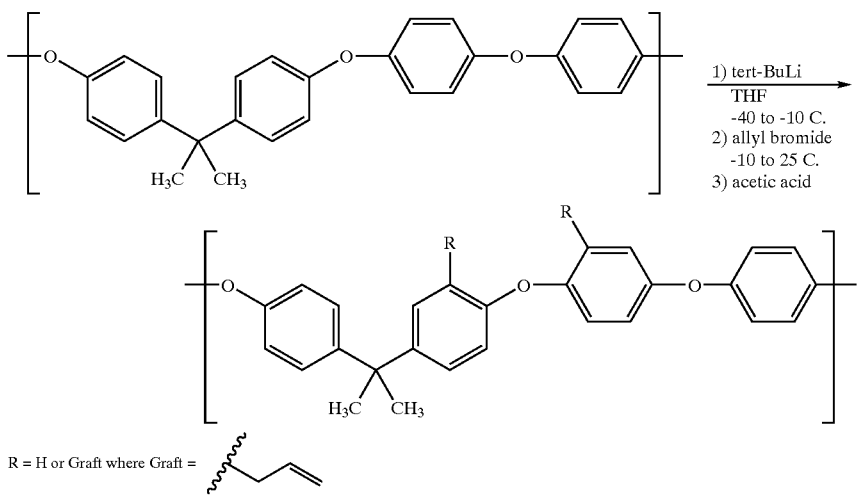

In a 500 mL, three-necked, round-bottomed flask fitted with a mechanical stirrer, nitrogen inlet, and addition funnel, 20.00 g (0.0507 mol of polymer repeat unit) of the PAE-1B prepared in Example 2 were dissolved in 350 mL of anhydrous tetrahydrofuran with stirring. The solution was cooled to −40° C. with the aid of a carbon dioxide/acetone bath. With vigorous stirring, 20 mL (0.0340 mol) of 1.7 M tert-butyllithium in pentane were added over a 5–15 minute period. The solution turned from a clear, light yellow colored solution to a deep red colored solution. The cooling bath was removed and the solution was allowed to warm to −10° C. A 4.00 g (0.0332 mol) portion of allyl bromide was added. The cooling bath was removed and the solution was gradually warmed to 20° C. over 30 minutes. After maintaining the reaction mixture at this temperature for 3 hours with stirring, 20 mL of acetic acid were added. The light green solution was filtered and then precipitated in 1600 mL of methanol. After drying the polymer precipitate in a vacuum oven set at 60° C., 19.60 g of PAE-1B polymer bearing allyl groups ortho to the ether links in the polymer were recovered. NMR analysis of the polymer revealed that 35.0% of the polymer repeat units contained the allyl group.

EXAMPLE 7

Grafting 3-Chloro-2-Methylpropene onto PAE-1B

The process of this example is represented by the following equation:

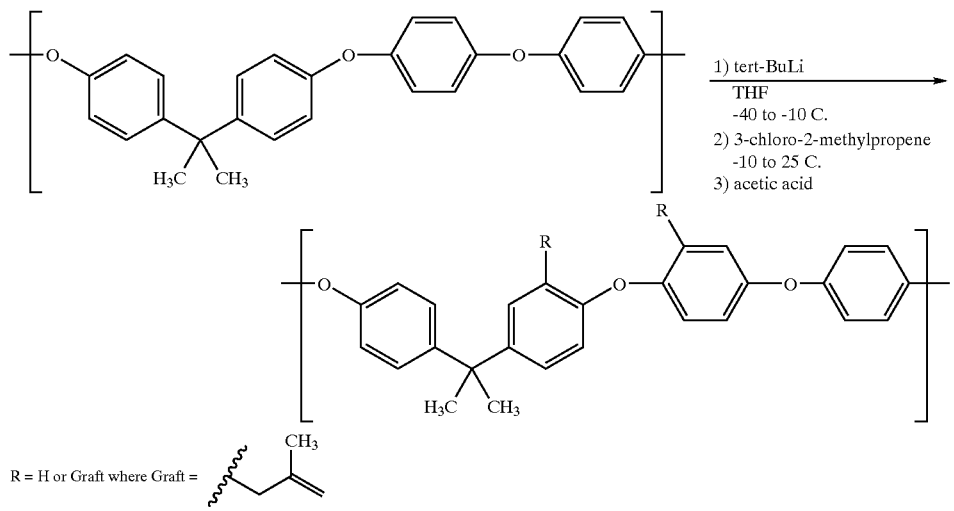

In a 500 mL, three-necked, round-bottomed flask fitted with a mechanical stirrer, nitrogen inlet, and addition funnel, 20.00 g (0.0507 mol of polymer repeat unit) of the PAE-1B prepared in Example 2 were dissolved in 350 mL of anhydrous tetrahydrofuran with stirring. The solution was cooled to −40° C. with the aid of a carbon dioxide/acetone bath. With vigorous stirring, 20 mL (0.0340 mol) of 1.7 M tert-butyllithium in pentane were added over a 5–15 minute period. The solution turned from a clear, light yellow colored solution to a deep red colored solution. The cooling bath was removed and the solution was allowed to warm to −10° C. A 6.00 g (0.0663 mol) portion of 3-chloro-2-methylpropene was added. The cooling bath was removed and the solution was gradually warmed to 20° C. over 30 minutes. After maintaining the reaction mixture at this temperature for 4 hours with stirring, 20 mL of acetic acid were added. The light green solution was filtered and then precipitated in 1600 mL of methanol. After drying the polymer precipitate in a vacuum oven set at 60° C., 21.17 g of PAE-1B polymer bearing methallyl groups ortho to the ether links in the polymer were recovered. NMR analysis of the polymer revealed that 30.0% of the polymer repeat units contained the methallyl group.

EXAMPLE 8

Grafting Vinyl Bromide onto PAE-1A

The process of this example is represented by the following equation:

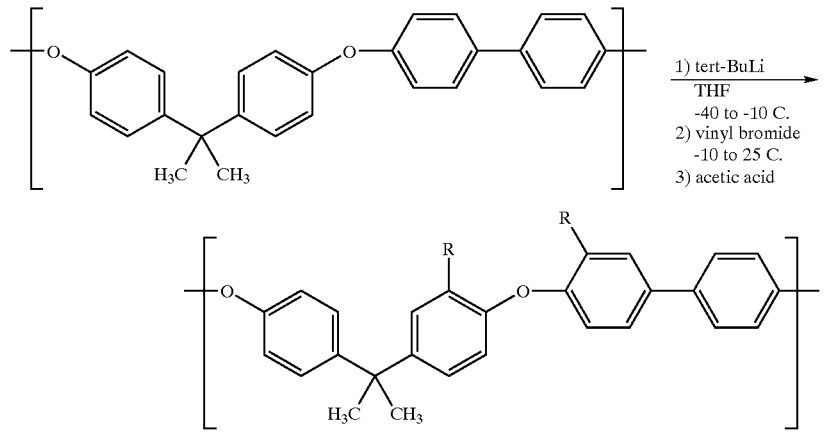

R = H or Graft where Graft = 

In a 500 mL, three-necked, round-bottomed flask fitted with a mechanical stirrer, nitrogen inlet, and addition funnel, 20.00 g (0.0528 mol of polymer repeat unit) of the PAE-1A prepared in Example 1 were dissolved in 350 mL of anhydrous tetrahydrofuran with stirring. The solution was cooled to −40° C. with the aid of a carbon dioxide/acetone bath. With vigorous stirring, 25 mL (0.0425 mol) of 1.7 M tert-butyllithium in pentane were added over a 5–15 minute period. The solution turned from a clear, light yellow colored solution to a deep red colored solution. The cooling bath was removed and the solution was allowed to warm to −10° C. A 25 mL portion of a 1.0 M solution of vinyl bromide in tetrahydrofuran (0.250 mol of vinyl bromide) was added. The cooling bath was removed and the solution was gradually warmed to 20° C. over 30 minutes. After maintaining the reaction mixture at this temperature for 17 hours with stirring, 25 mL of acetic acid were added. The light green solution was filtered and then precipitated in 1600 mL of methanol. After drying the polymer precipitate in a vacuum oven set at 60° C., 19.25 g of PAE-1A polymer bearing vinyl groups ortho to the ether links in the polymer were recovered. NMR analysis of the polymer revealed that 2.0% of the polymer repeat units contained the vinyl group.

In a 500 mL, three-necked, round-bottomed flask fitted with a mechanical stirrer, nitrogen inlet, and addition funnel, 20.00 g (0.0528 mol of polymer repeat unit) of the PAE-1 A prepared in Example 1 were dissolved in 350 mL of anhydrous tetrahydrofuran with stirring. The solution was cooled to −40° C. with the aid of a carbon dioxide/acetone bath. With vigorous stirring, 25 mL (0.0425 mol) of 1.7 M tert-butyllithium in pentane were added over a 5–15 minute period. The solution turned from a clear, light yellow colored solution to a deep red colored solution. The cooling bath was removed and the solution was allowed to warm to −10° C. A 4.00 g (0.0263 mol) portion of citral was added. The cooling bath was removed and the solution was gradually warmed to 20° C. over 30 minutes. After maintaining the reaction mixture at this temperature for 3 hours with stirring, 25 mL of acetic acid were added. The light green solution was filtered and then precipitated in 1600 mL of methanol. After drying the polymer precipitate in a vacuum oven set at <50° C., 23.5 g of PAE-1A polymer bearing α-hydroxycitryl groups ortho to the ether links in the polymer were recovered. NMR analysis of the polymer revealed that 39.0% of the polymer repeat units contained the α-hydroxycitryl group.

EXAMPLE 9

Grafting Citral onto PAE-1A

The process of this example is represented by the following equation:

EXAMPLE 10

Grafting Citral onto PAE-2

The process of this example is represented by the following equation:

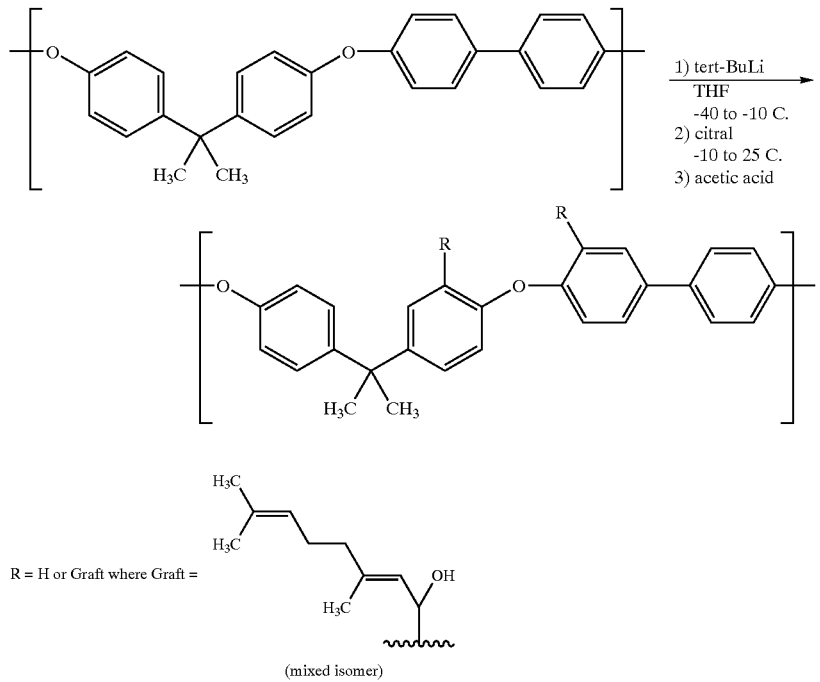

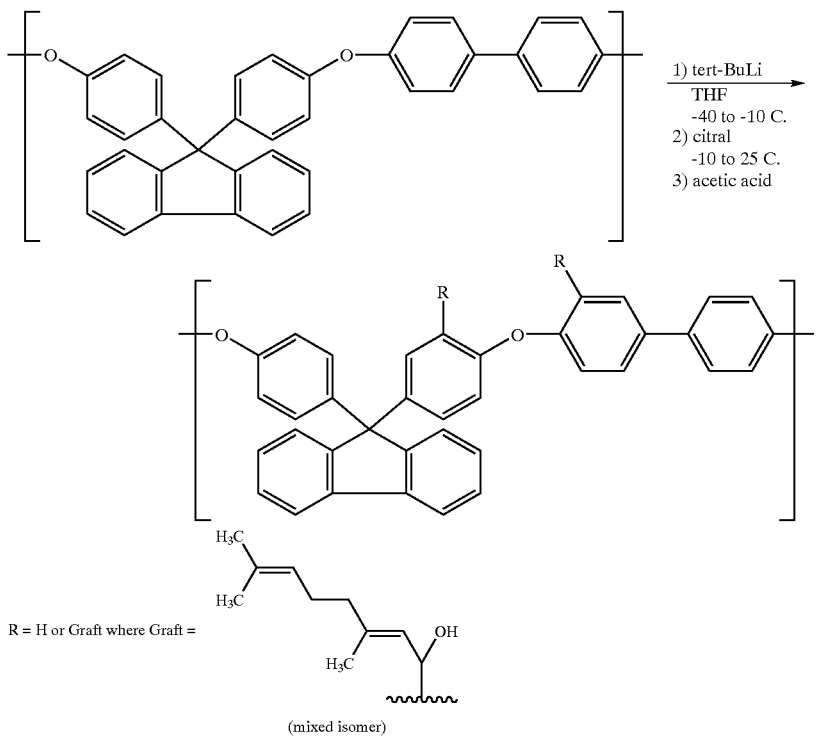

(mixed isomer)

In a 1000 mL, three-necked, round-bottomed flask fitted with a mechanical stirrer, nitrogen inlet, and addition funnel, 30.00 g (0.060 mol of polymer repeat unit) of the PAE-2 prepared in Example 3 were dissolved in 600 mL of anhydrous tetrahydrofuran with stirring. The solution was cooled to −40° C. with the aid of a carbon dioxide/acetone bath. With vigorous stirring, 25 mL (0.0425 mol) of 1.7 M tert-butyllithium in pentane were added over a 5–15 minute period. The solution turned from a clear, light yellow colored solution to a deep red colored solution. The cooling bath was removed and the solution was allowed to warm to −10° C. A 5.00 g (0.0328 mol) portion of citral was added. The cooling bath was removed and the solution was gradually warmed to 20° C. over 30 minutes. After maintaining the reaction mixture at this temperature for 1 hour with stirring, 3.60 g (0.600 mol) of acetic acid were added. The light green solution was filtered and then precipitated in 1000 mL of methanol. After drying the polymer precipitate in a vacuum oven set at <50° C., 31.33 g of PAE-2 polymer bearing α-hydroxycitryl groups ortho to the ether links in the polymer were recovered. NMR analysis of the polymer revealed that 32.0% of the polymer repeat units contained the alpha-hydroxycitryl group.

EXAMPLE 11

Properties of Select Poly(Arylene Ether)s with Olefinic Crosslinking Groups

Figure 5:
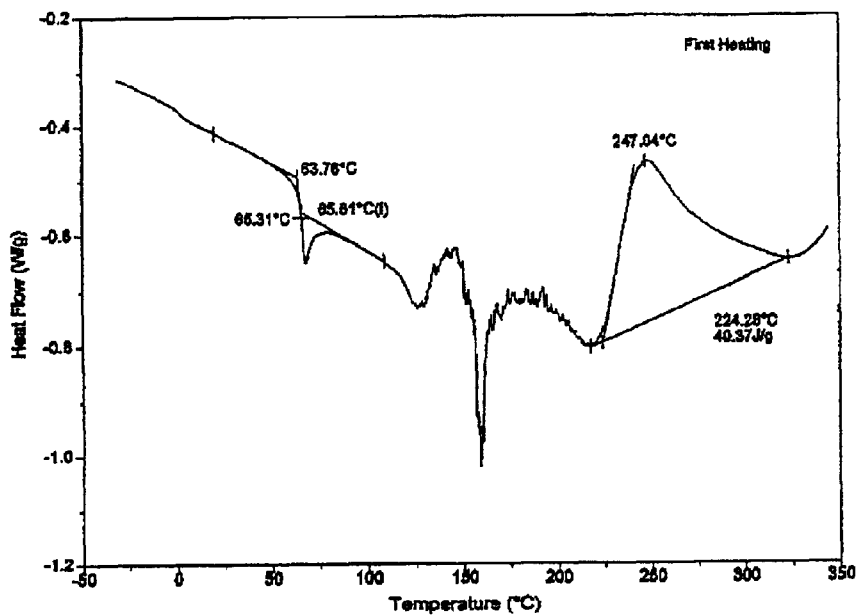
FIG. 5 is a graph showing a DSC spectrum of the composition of Example 9 in first heating.
Figure 6:
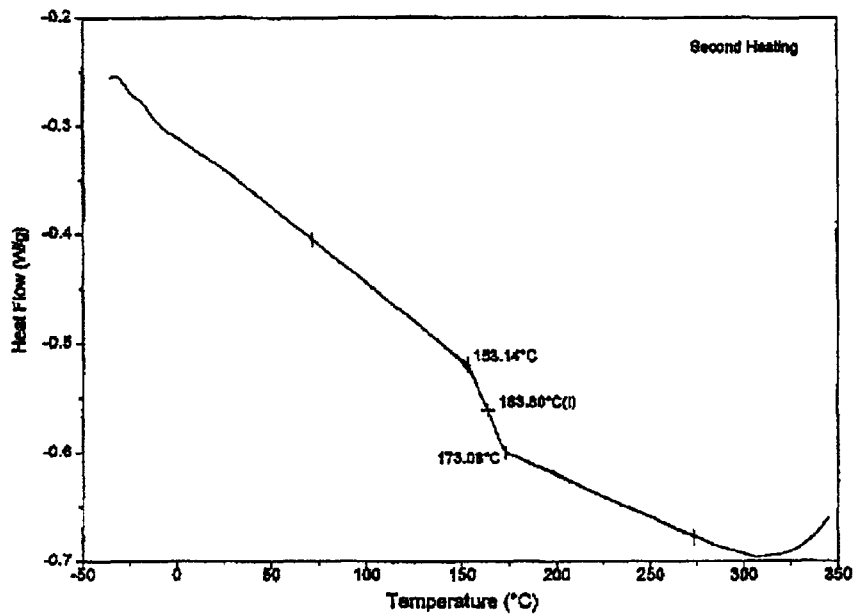
FIG. 6 is a graph showing a DSC spectrum of the composition of Example 9 in second heating.

Poly(arylene ether)s, PAE-1A from Example 1 and PAE-2 from Example 3, were derivatized with citral grafts in Examples 9 and 10 respectively. The mechanical properties of the grafted and ungrafted polymers were compared. The mechanical properties were obtained on freestanding films of about 30 microns, with the results shown in Table 1 and FIGS. 1–4. Ungrafted PAE-1A and PAE-2 do not undergo any crosslinking when heated to 170° C. They remain thermoplastic. However, the citral-grafted derivatives undergo crosslinking, forming a thermoset product. The on-set temperatures for the crosslinking reaction with the citral graft with no added catalyst or initiator appear to be 125° C. and 160° C., as indicated by the endotherms obtained by differential scanning calorimetry (DSC) of PAE-1A with 39% citral graft as shown in FIGS. 5 and 6.

TABLE 1

Properties of PAE-1A and PAE-2, Ungrafted and Grafted with Citral, Before and After 170° C. Thermal Cure.

| Film No. | Material (Example No.) | Properties before Cure at 170° C. | Properties after Cure at 170° C. |
| --- | --- | --- | --- |
| 1 | PAE-1A (1) | Tg = 154° C. Thermoplastic 0.17 wt % Moisture Uptake | No Change |
| 2 | PAE-1A with Citral (9) | Tg~62–65° C. Thermoplastic | Tg = 195° C. (DMA) Tg = 164° C. (DSC) Thermoset E' = 1.5 e10 dynes/cm$^2$ @ 50° C. E' = 7.50 e7 dynes/cm$^2$ @ 250° C. On-set of reaction (DSC): 125° C. & 160° C. |
| 3 | PAE-2 (3) | Tg = 275° C. Thermoplastic 0.25 wt % Moisture Uptake | No Change |

TABLE 1-continued

Properties of PAE-1A and PAE-2, Ungrafted and Grafted with Citral, Before and After 170° C. Thermal Cure.

| Film No. | Material (Example No.) | Properties before Cure at 170° C. | Properties after Cure at 170° C. |
|---|---|---|---|
| 4 | PAE-2 with Citral (10) | Tg unknown (crosslinking reaction temperature at or below Tg) Thermoplastic | Tg = 250° C. (DMA) Tg = 210° C. (DSC) Thermoset E' = 1.5 e10 dyn/cm$^2$ @ 50° C. E' = 5.3 e7 dyn/cm$^2$ @ 300° C. |

While the invention has been described in detail and with reference to specific examples thereof, it will be apparent to one skilled in the art that various changes and modifications can be made therein without departing from the spirit and scope thereof.

What is claimed is:

1. A poly(arylene ether) polymer including polymer repeat units of the following structure:

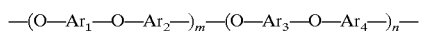

where $Ar_1$, $Ar_2$, $Ar_3$, and $Ar_4$ are identical or different aryl radicals, m is 0 to 1, n is 1-m, and at least one of the aryl radicals is grafted to at least one unsaturated group that is non-aromatic and is adapted to crosslink at a curing temperature below 200° C. without producing volatiles during curing and without providing functional groups after curing.

2. The polymer of claim 1, wherein one of the aryl radicals of the polymer repeat units is grafted to one unsaturated group.

3. The polymer of claim 1, wherein at least one of the aryl radicals of the polymer repeat units is grafted to more than one unsaturated group.

4. The polymer of claim 3, wherein the polymer repeat units have the following structure:

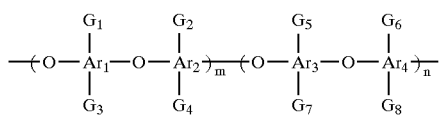

where $G_1$, $G_2$, $G_3$, $G_4$, $G_5$, $G_6$, $G_7$ and $G_8$ are identical or different species of the at least one unsaturated group.

5. The polymer of claim 1, wherein an average number of unsaturated groups per polymer repeat unit is 0.01 to 8.0.

6. The polymer of claim 5, wherein the average number of unsaturated groups per polymer repeat unit is 0.01 to 4.0.

7. The polymer of claim 5, wherein the average number of unsaturated groups per polymer repeat unit is 0.25 to 1.0.

8. The polymer of claim 5, wherein the at least one unsaturated group is selected from the group consisting of an alkylene radical, an alkyldiene radical, an α-hydroxyalkylene radical and an α-hydroxyalkyldiene radical.

9. The polymer of claim 5, wherein the at least one unsaturated group is derived from isoprene.

10. The polymer of claim 5, wherein the at least one unsaturated group is selected from the group consisting of:

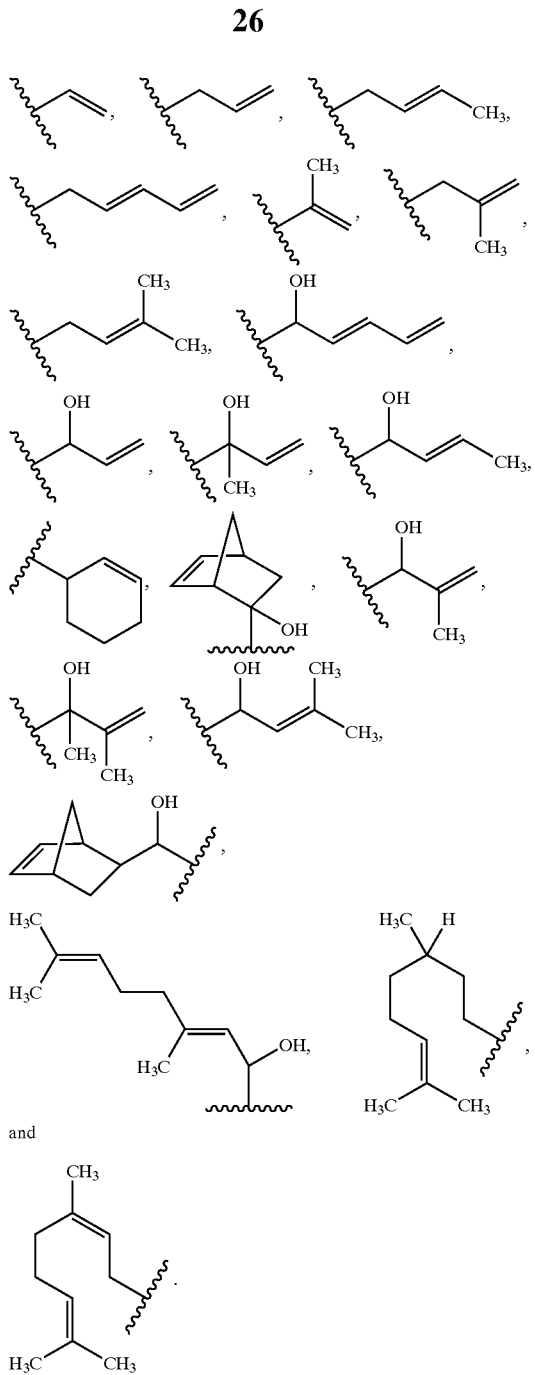

11. The polymer of claim 5, wherein the aryl radicals are independently selected from the group consisting of:

-continued
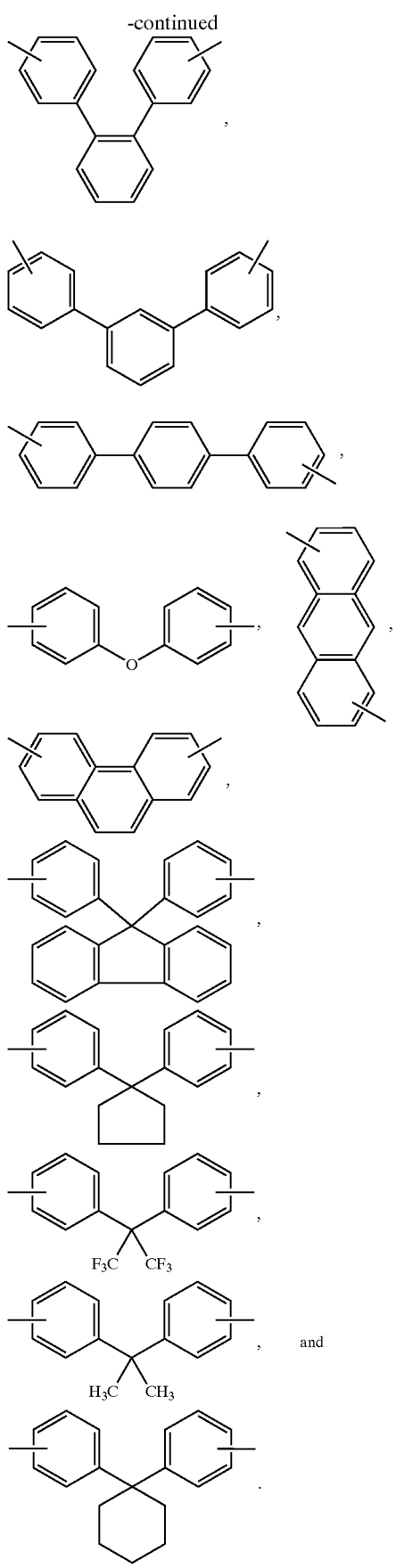
12. The polymer of claim 7, wherein the aryl radicals are independently selected from the group consisting of:
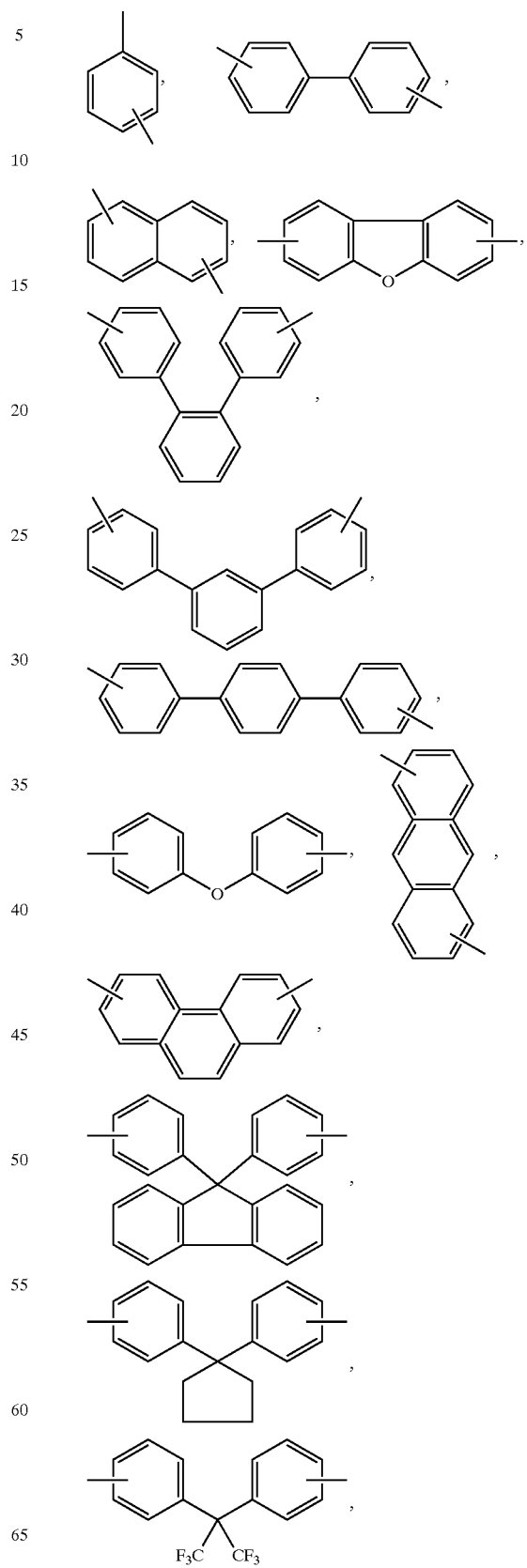

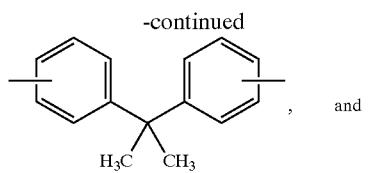, and

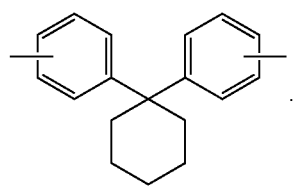.

13. The polymer of claim 5, wherein at least one of the aryl radicals is selected from the group consisting of 9,9-bis(4-hydroxyphenyl)fluorene, 2,2-diphenylhexafluoropropene and 2,2-diphenylpropene.

14. The polymer of claim 5, wherein the polymer units m and n are independently selected from the group consisting of:

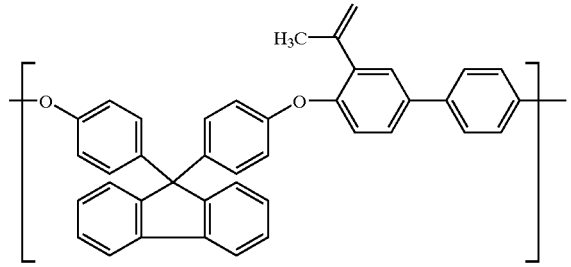

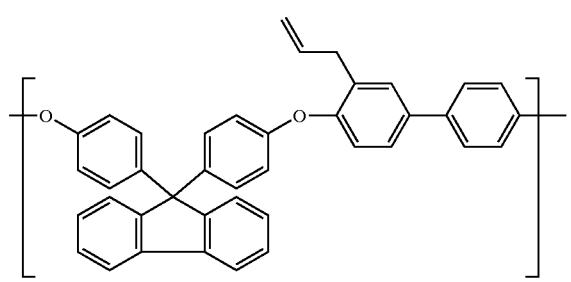

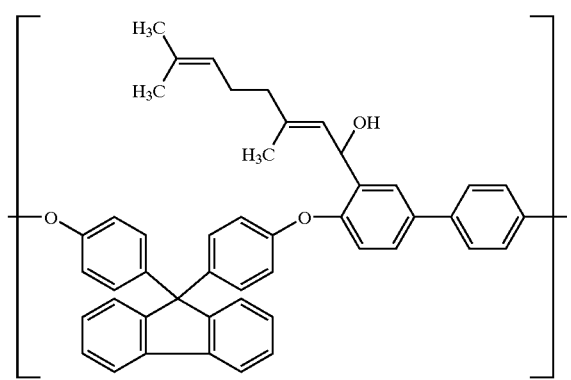

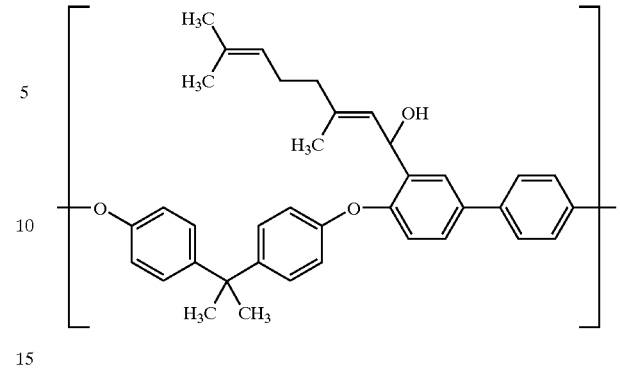

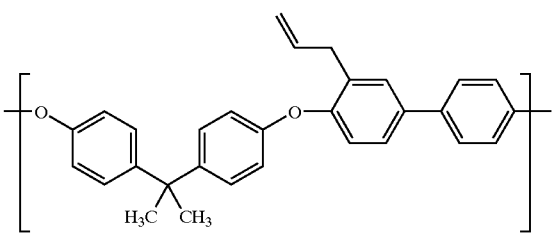

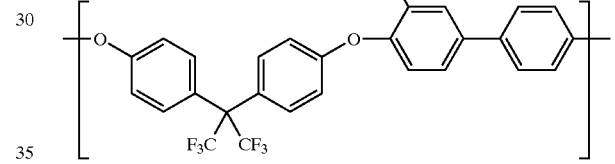

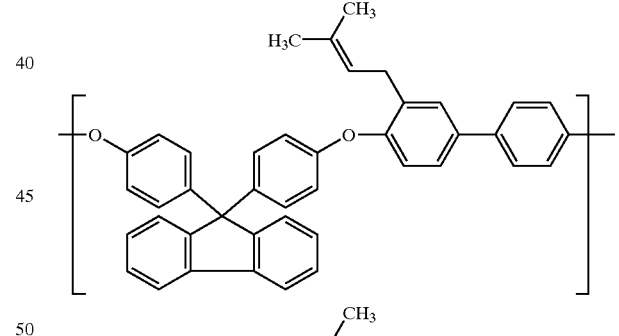

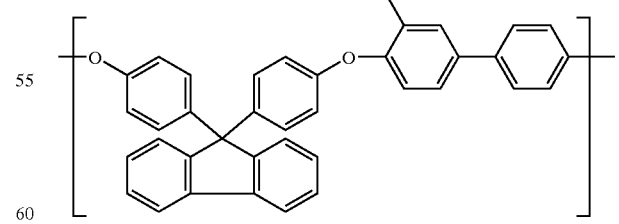

and corresponding non-grafted polymer repeat units.

15. The polymer of claim 5, wherein the average number of unsaturated groups per polymer unit is more than 0.1 and not more than 1, and the poly(arylene ether)polymer comprises one of the following polymer units m and n:
a)
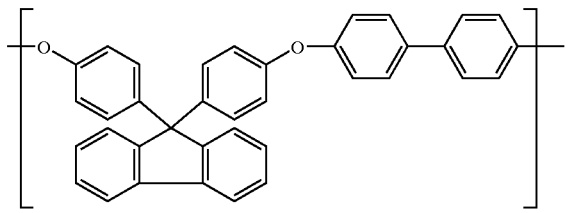
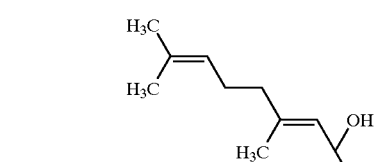
b)
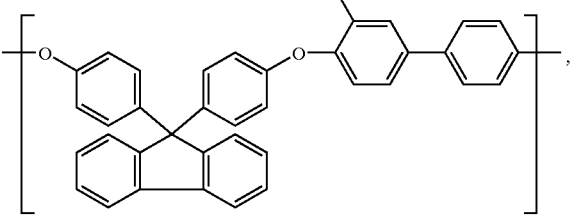
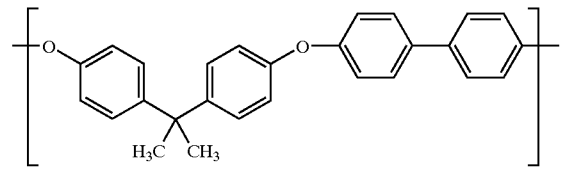
c)
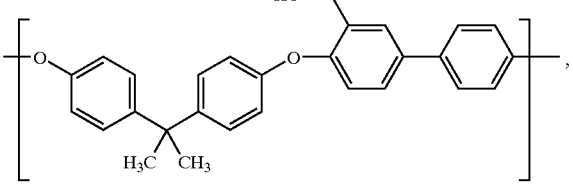
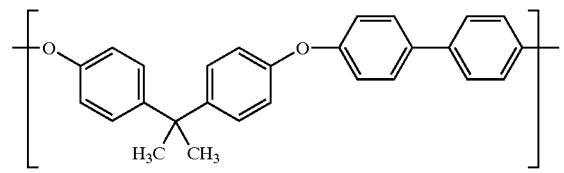
d)
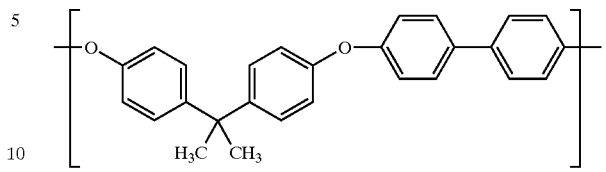
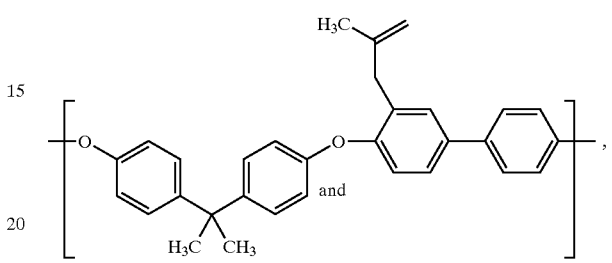
e)
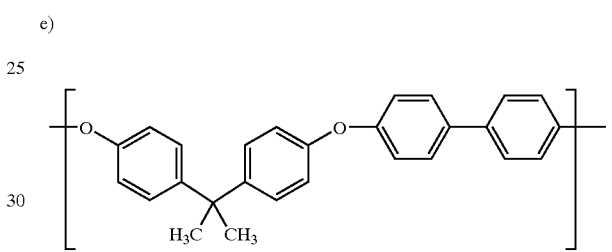
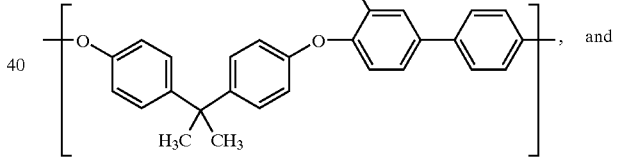
f)
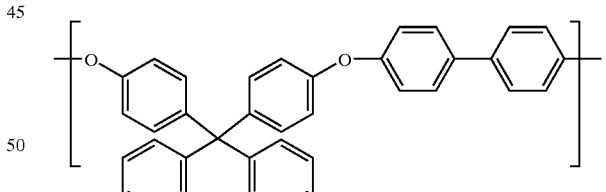
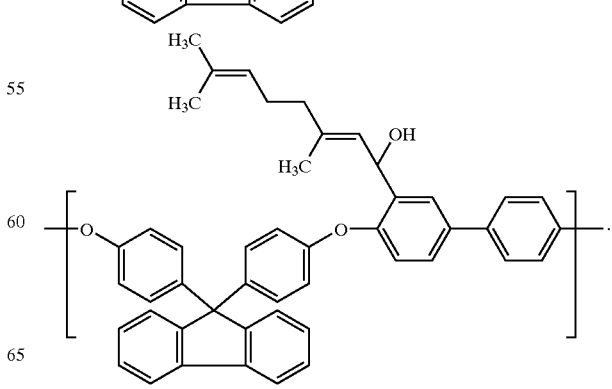

16. The polymer of claim 5, wherein at least one of the aryl radicals is:

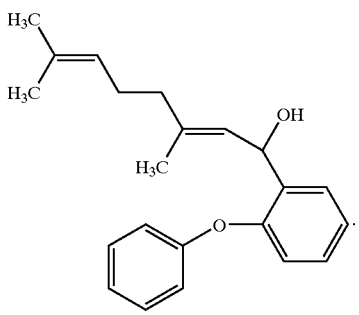

17. The polymer of claim 5, wherein m is 0.05 to 0.95.

18. The polymer of claim 5 in cured form, said cured form of the polymer having a Tg from 160 to 180° C., a dielectric constant below 2.7 with frequency independence, and a maximum moisture absorption of less than 0.17 wt %.

19. The polymer of claim 5, in an interlayer dielectric film.

20. The polymer of claim 5, in a die-attach adhesive.

21. A composition comprising the polymer of claim 1 and a diluent, wherein the diluent does not afford a functional group or interfere with mechanical or electrical properties of the composition.

* * * * *